UNITED STATES PATENT OFFICE.

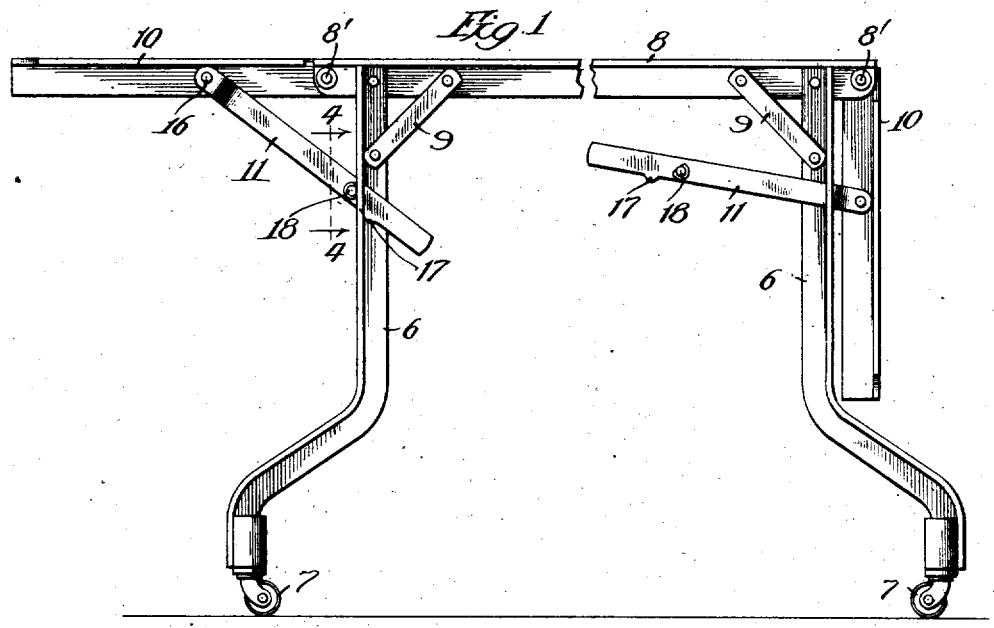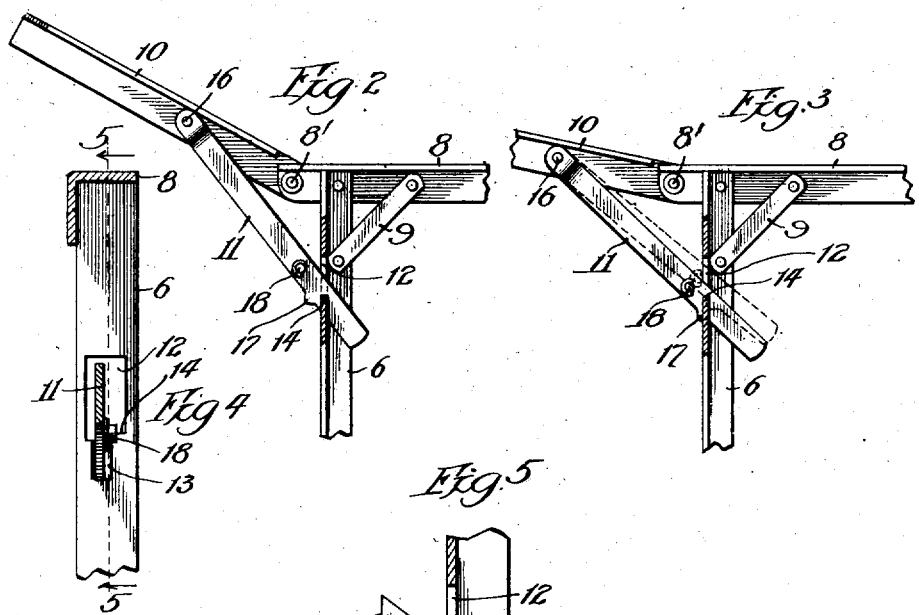

GEORGE G. POWERS, OF CHICAGO, ILLINOIS, ASSIGNOR TO UNION WIRE MATTRESS CO., OF CHICAGO, ILLINOIS, A CORPORATION OF ILLINOIS.

FOLDING COUCH.

973,562.      Specification of Letters Patent.      Patented Oct. 25, 1910.

Application filed February 4, 1910. Serial No. 542,021.

*To all whom it may concern:*

Be it known that I, GEORGE G. POWERS, a citizen of the United States, residing at Chicago, in the county of Cook and State of Illinois, have invented certain new and useful Improvements in Folding Couches, of which the following is a specification.

This invention relates to folding couches, and particularly to the means for holding the leaves or brackets thereof, in raised or operative position.

It is an object of my invention to provide means of this character, which will automatically lock the leaf and maintain it in horizontal operative position when it has been raised to such position, and which will be automatically unlocked to permit the leaf to be lowered by simply elevating the outer end of the leaf above its normal operative position and letting it down quickly.

Another object of my invention is the provision of a device of this character which shall be simple in construction and cheap to make, and which shall have no loose pieces to become detached or lost, thereby reducing the time and labor of manufacturing.

It is a further object of my invention to provide a device which will either lock the leaf in normal operative position or prevent its being locked, depending upon the speed with which the leaf is lowered at a certain point.

I have shown in the accompanying drawings for the purpose of illustration merely, a preferred embodiment of my invention, but it will be understood that I am not restricted to the exact embodiment shown, the scope of my invention being set forth in the appended claims.

Referring now to the drawings illustrating the preferred embodiment of my invention, Figure 1 is an end elevation of a couch showing one of the leaves in raised or operative position, and the other in lowered or inoperative position. Fig. 2 is an elevation of one post showing the leaf as raised above its normal position preparatory to being lowered. Fig. 3 is a view similar to Fig. 2 showing another position of the leaf. Fig. 4 is a section on the line 4—4 of Fig. 1, and, Fig. 5 is a section on the line 5—5 of Fig. 4.

In the drawings the couch posts 6 are of ordinary construction, preferably being made of angle iron and bent to the desired shape to provide a base large enough to prevent the couch from tipping when the leaves are in raised position, and usually supplied with rollers or casters 7. The end member 8 of the couch frame is riveted or bolted to the upper ends of the posts, and for the purpose of lending rigidity to the structure, the joints are usually reinforced by suitable braces 9. To the outer projecting ends of the frame piece 8, are pivotally attached at 8′, the leaves or brackets 10. Since the locking mechanisms for holding the leaves in elevated position on each side of the couch, are duplicates of each other, a detail description of only one side will be necessary.

Referring now more particularly to Fig. 4, it will be seen that the outer side of the post 6 is provided with a slot 12, of considerable width at its upper end but reduced to the narrow portion 13 at its lower end, whereby an inwardly extending shoulder 14 is produced between the wide and narrow portions of the slot. A brace 15 is pivotally connected to the leaf 10 at 16, and extends through and is adapted to slide longitudinally in the slot 12 in the post. The lower edge of the brace is provided with a curved or cam-shaped projection or extension 17 which may be formed thereon in any convenient manner, but preferably it is simply struck out from the edge of the brace by a punch or similar tool. A stud or pin 18 extends laterally from one side of the brace 15 and is adapted to engage with the outer face of the shoulder 14 on the post 6 to prevent longitudinal downward movement of the brace and thereby maintain the leaf in normal elevated position. The leaf may be raised from its lowered position by elevating the outer end thereof, the brace sliding longitudinally upwardly and outwardly through the slot 12, the lower edge thereof resting in the bottom of the narrower portion of the slot 13. As the lug moves upwardly with the brace it will engage the inner face of the shoulder 14, but owing to the diagonal direction in which it is moving relatively to the shoulder and to the circular shape of the front side of the stud, it readily slides up over the shoulder 14 and drops behind the outer face thereof, so that when the leaf is released the stud will be engaged with the shoulder and prevent downward longitudinal movement of the brace and thereby maintain the leaf in the desired operative position. The relative position of the brace and post when the leaf is raised, is shown in Figs. 4 and 5 and at the left in Fig. 1.

As is evident from the drawings, the lower edge of the brace slides along and rests upon the bottom of the narrow portion 13 of the slot, and when the cam-shaped projection 17 slides over the shoulder 14, it is obvious that the inner end of the brace, as the movement thereof is slow, will be raised a distance equal to the height of the cam-shaped projection or extension. If the movement of the cam over the shoulder is a rapid one, it will be apparent that sliding engagement of either one of the cam surfaces with the shoulder will cause the inner end of the brace to be raised quickly or to jump.

With the leaf 10 in the elevated position, shown at the left in Fig. 1, if it is desired to lower the same it is first further elevated to the position shown in Fig. 2, which brings the cam projection 17 outside the post 6. By releasing the outer end of the leaf 16 it will be allowed to drop quickly, and as the lower face of the cam projection 17 strikes the bottom of the narrow slot 13, the inner end of the brace will be caused to jump or fly upwardly so that the stud 18 will clear the shoulder 14 and the leaf will be free to assume its lowered position. If, in bringing the leaf to its operative position, it should be raised higher than necessary, as for instance into the position shown in Fig. 2, the cam projection 17 will not cause the inner end of the brace to jump so that the lug will clear the shoulder 14 in the slot if the leaf is lowered slowly, permitting the cam projection to slide over the edge of the slot 13, so that the lug will assume its operative locked position against the outer surface of the post. It will be evident from the foregoing that when the leaf is raised into the position shown in Fig. 2, it may be locked in horizontal position or lowered into inoperative position, depending upon whether it is lowered slowly or quickly. If the downward movement is rapid, the cam projection engaging the bottom of the slot will throw the brace upwardly and permit the stud 18 to pass through the wide portion of the slot 12; on the other hand, if the leaf is lowered slowly, the cam projection will simply slide over the bottom of the slot 13 without jumping, and the brace and the leaf will be locked in normal operative position by engagement of the stud with the wall of the slot.

While I have shown and described a preferred embodiment of my invention, it will be understood that the minor mechanical details are capable of considerable variation without departing from the spirit of the invention or sacrificing any of the material advantages thereof.

I claim—

1. In a folding couch, in combination, a couch post, a hinged leaf, and a brace for said leaf provided with lateral outstanding locking means for engagement with the post to retain the leaf in operative position and means integral with said brace and disposed between the ends of said brace, adapted to coöperate with said post for rendering said locking means inoperative upon downward movement of the leaf, substantially as described.

2. In a folding couch, the combination of a couch post having a slotted opening therethrough, a hinged leaf, a brace connected to said leaf and provided with a laterally projecting stud adapted to engage a side wall of the post-slot and retain the leaf in raised position, and means on the brace adapted to coöperate with the bottom of said slot to prevent operative engagement of the stud with said wall whereby the leaf may be lowered, substantially as described.

3. In a folding couch, the combination of a couch post, a hinged leaf, and a straight brace for said leaf provided with lateral outstanding locking means for engagement with the post to retain the leaf in operative position, and means integral with and disposed upon the lower edge of said brace and adapted to coöperate with the outer side of said post for rendering said locking means inoperative upon downward movement of the leaf, substantially as described.

4. In a folding couch, the combination of a couch post having a slot therein with a narrow lower portion and a larger upper portion, a hinged leaf, and a brace connected to said leaf and adapted to slide in said slot, said brace having a stud projecting from a side thereof and adapted by coöperating with a side wall of the narrow portion of said slot to maintain said leaf in operative position, said brace having means on its bottom edge adapted to co-act with the bottom wall of said slot to project the brace upward during lowering of the leaf from a position above normal, whereby to permit the stud to pass through the enlarged part of said slot and allow folding of the couch leaf, substantially as described.

5. In a folding couch, the combination of a couch post having a slotted opening therethrough, a hinged leaf, and a brace connected to said leaf and provided with a stud adapted to engage the wall of the slot in said post and retain the leaf in raised position, said brace having a curved projection extending outwardly from the otherwise straight lower edge of said brace and adapted to co-act with the bottom wall of said slot to project the brace upwardly during lowering of the leaf from a position above normal, whereby to permit the stud to pass through an enlarged part of said slot and allow folding of the couch leaf, substantially as described.

GEORGE G. POWERS.

Witnesses:
   Geo. C. Davison,
   I. J. Wilson.